Dec. 28, 1965    F. B. HUGLE ET AL    3,226,271
SEMI-CONDUCTIVE FILMS AND METHOD OF PRODUCING THEM
Original Filed March 29, 1956

INVENTOR.
FRANCES B. HUGLE
AND WILLIAM B. HUGLE,
BY Allen & Allen
ATTORNEYS

United States Patent Office 3,226,271
Patented Dec. 28, 1965

3,226,271
SEMI-CONDUCTIVE FILMS AND METHOD OF PRODUCING THEM
Frances B. Hugle and William B. Hugle, Thousand Oaks, Calif., assignors to D. H. Baldwin Company, a corporation of Ohio
Original application Mar. 29, 1956, Ser. No. 574,804, now Patent No. 2,994,621, dated Aug. 1, 1961. Divided and this application July 31, 1961, Ser. No. 128,223
7 Claims. (Cl. 148—186)

This is a division of applicants' copending case, Serial No. 574,804, filed March 29, 1956 and bearing the same title, which case issued as Patent 2,994,621 on August 1, 1961.

The invention relates to methods of preparing semi-conducting films, such as photo-conductors, and to the products of such methods.

As is well known, various metals and semi-metals including cadmium, tellurium, lead, zinc, germanium, indium, antimony, selenium, mercury, silicon, and sulfur, are capable of forming in various combinations photoelectric or semiconductive films, which have utility in electrical apparatus. The present invention applies to all of these. However, great difficulty has been encountered in the past in forming films of combinations of metals or semi-metals. For example, if a cadmium selenide film is desired, it has been usual to produce the cadmium selenide first in the form of crystals and then vaporize the crystals to form the films. Such a method is in general elaborate, time-consuming, costly, and in some instances involves serious operational hazards.

It is an object of the invention to provide a method for the direct production of semi-conductive films of metals or semi-metals which will be cheaper and more convenient than methods hitherto current in the art.

It is an object of the invention to provide a method for the formation of semi-conductive films of metals or semi-metals in combination, which method in most instances requires no atmosphere control.

It is an object of the invention to provide a method of forming semi-conductive films of metals or semi-metals in combination, in which stoichiometric proportions may be automatically attained.

It is an object of the invention to provide semi-conductive films of metallic or semi-metallic materials or combinations which may be selectively of the n or p types.

It is an object of the invention to provide an improved method of making semi-conductive films having alternate areas of n and p characteristics.

It is an object of the invention to provide a mode of manufacturing semi-conductive films of metallic or semi-metallic combinations wherein the extent, area, disposition and thickness of the films can be easily, cheaply and accurately controlled.

These and other objects of the invention, which will be set forth hereinafter or will be apparent to one skilled in the art upon reading these specifications, are accomplished by that procedure, in that construction and arrangement of parts, and in those products, of which certain exemplary embodiments will now be described. Reference is made to the accompanying drawings wherein.

Briefly, in the practice of the invention, a series of films of metals or semi-metals is formed with the films in superposed relationship on a suitable substrate or support. These films can readily be formed by vaporizing the film-forming substance in a vacuum. After one or more layers each of the anion and of the cation have been evaporated onto the support, the resultant film combination is heated until the reaction between the anion and cation layers is complete. The film then will be in its final form.

In carrying on the method, the following factors should be kept in mind:

(1) The thickness of the several films of metals or semi-metals formed in superposition as aforesaid may be controlled to give stoichiometric proportions in the final product, or any given departure from stoichiometric portions in either direction.

(2) In the case of composites which for their proper functioning should have stoichiometric or substantially stoichiometric proportions, the method affords a simple way of securing stoichiometric proportions automatically. This because, after the combination of ingredients has been effected in a suitable heat treatment, it is usually readily possible to vaporize off the excess of at least the more easily vaporized unreacted ingredient.

(3) It has been found that it is readily possible to form the films in the presence of accurately selected amounts of given impurities, and to attain film composites in which the impurities are homogeneously distributed.

(4) The nature and performance of the resulting films can be controlled to a very large extent by control of the final heat treatment.

(5) Since, although the metals or semi-metals are vaporized in the initial film forming operation, the actual films are formed by condensation at relatively low temperatures, it thus becomes possible to form accurately located and shaped films on suitable supports by simple masking techniques, as hereinafter more fully explained.

(6) It is possible to make a film comprising regularly alternating areas of n and p type material by differentially depositing the initial films so that adjacent small areas will differ in a regular fashion from each other as to their relative content of the materials vaporized, all as hereinafter explained.

Figure 1:
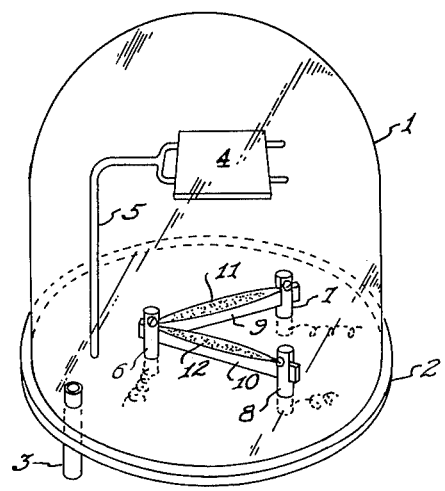
FIG. 1 is a diagrammatic perspective showing of a bell jar apparatus for the production of films of metals or semi-metals.

The apparatus required for the practice of the process is simple and inexpensive. In FIG. 1 there is shown diagrammatically a type of vacuum-vaporization apparatus which may be used for the formation of the individual films. This comprises a bell jar 1 on a base 2 with which it has gas-tight connections, as well known in the art. The space inside the bell jar may be evacuated through a suitable conduit 3. The element 4 on which the films are to be produced may be held within the bell jar on a suitable support 5. Three electrical terminals 6, 7 and 8 are shown on the base 2. The metal or semi-metal to be vaporized is placed in boats interconnecting these terminals. The boats are formed by folding sheets of molybdenum, the folded portions being juxtaposed at the ends of the boats but spread in the middle. The boats are indicated at 9 and 10. In the particular embodiment an end of each boat is clamped at the terminal 6. The opposite end of the boat 9 is engaged by terminal 7 and the opposite end of the boat 10 is engaged by terminal 8. A cation metal, such for example, as lead, may be placed in the boat 9, as at 11, while an anion metal or semi-metal, e.g. selenium, may be placed in the boat 10, as at 12. The element 4 may be a suitably cleaned element of glass or ceramic.

In the use of the apparatus, the bell jar will be highly evacuated. When this is accomplished, the metal 11 in the boat 9 may be vaporized by applying a suitable current between terminals 6 and 7 to heat the boat. Vapors of the metal will rise in the bell jar and will condense on the element 4. When a suitable film of metal on the element 4 has been so produced, the current may be turned off. The continued evacuation of the apparatus rapidly removes any remaining vapors of the metal. Then current may be applied between terminals 6 and 8 so as to heat the boat 10 and vaporize the metal or semi-metal contained therein. A second film will condense on the element 4 overlying the first film. The operation may be repeated as desired at given times. The thickness of the films can be controlled in the usual fashion by varying such factors as temperature, time, the quantity of metal being vaporized, and the like.

The bell jar may, if desired, be equipped with means for the subsequent heating of the element 4 with its superposed films. Thus, a flat molybdenum electric heater could be used in the bell jar to heat the element.

Figure 2:
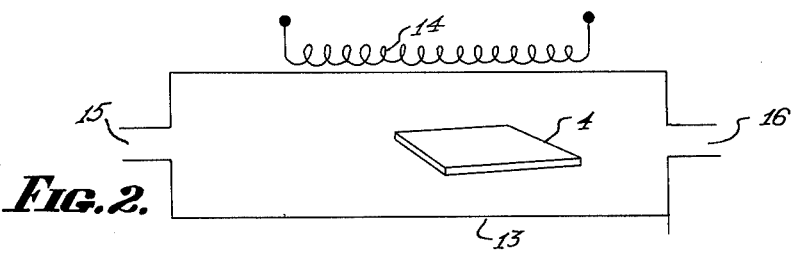
FIG. 2 is a diagrammatic sectional view of apparatus in which the films may be caused to combine.

In many operations it is more convenient to provide a separate heating furnace. Such a furnace is diagrammatically illustrated in in FIG. 2 as comprising a tubular furnace element 13 and heating means 14. Entrance and exit means 15 and 16 may be provided either for atmospheric control or for the effecting of a vacuum. It will be understood that where the films, or either of them, would be subject to excessive oxidation under temperatures of 300° to 400° C., the heating will take place either in a vacuum or in some inert atmosphere, such for example, as nitrogen, argon, or the like. The element 4 is placed within the furnace and heated until reaction between the two metals or semi-metals takes place.

*Example 1*

Using an apparatus such as has been described, a glass slide in a thoroughly cleaned condition was placed in the bell jar. Lead and selenium were placed in the boats 9 and 10 respectively. The jar was evacuated to a pressure of .1 micron, and a layer of selenium was evaporated onto the slide by heating the appropriate boat. Then a layer of lead was so deposited. At this point the superposed films formed transparent layers.

The slide was then placed on a flat molybdenum heater and, when the vacuum was restored, the temperature was raised to 400° C. In a few moments the film became opaque and silvery in appearance; and the reaction was complete.

Lead selenide films formed in this way are uniform in appearance and characteristics and are photosensitive.

In the fashion indicated, either n or p type films may be formed by varying the thicknesses of the layers and/or the temperature and time of the heating procedure. More than two layers may be deposited of either of the metals or semi-metals.

The support on which the films are formed should, of course, be of a material capable of withstanding the necessary heat treatment. Thus, it will be found that the glasses and ceramics are most available as substrates for use in this process. The films may be combined with printed circuitry if desired. While printed circuit elements may be formed on the composite in various ways, it is also possible to form the printed circuit first and impose the composite thereon. The material of the printed circuit if first imposed on the substrate should be such as will not fuse or amalgamate with the substance of the films at the temperature of the heat treatment. Otherwise there is substantially no limitation on the substance of the printed circuit excepting that it have the requisite conductivity. Metals and alloys are available. Excellent results have been obtained, for example, with Inconel metal. The printed circuit may be imposed on the substrate in any suitable fashion, as by printing, or stenciling, or by etching an over-all coating.

Figure 4:
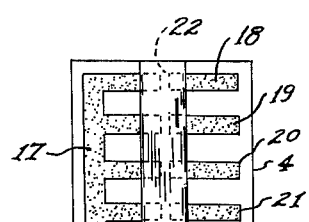
FIG. 4 is a diagrammatic view of a type of photocell which may be formed in accordance with the invention.

In FIG. 4 there is illustrated a structure comprising a suitable base or substrate 4 having thereon a printed circuit comprising a common bus 17 and comb-like spaced teeth 18, 19, 20, 21, etc. The teeth are divided from each other by lines of separation indicated at 22. In one form of device a line of separation common to all of the teeth is formed by means of an engraving tool passed across the teeth with a ruling machine. This, of course, gives a very narrow line of separation.

The structure illustrated in FIG. 4 is designed to provide four (or more) photoelectric cells which are capable of independent operation without mutual interference even though the semi-conductive layer 23 is common to the several photocells. The condition described can be obtained if the width of the separation between electrodes is small with respect to the separation between the cells themselves. In the use of the multiple photocell of FIG. 4, contact is made to the bus 17 on one side and individually to the separated portions of the teeth 18 to 21 on the other side.

In the formation of this and other types of photocells, it will normally be desired to confine the semi-conductive layer 23 to some specific area of the support, which area may be regular or irregular. This is easily accomplished by masking techniques of simple character. Masking substances may be painted or otherwise deposited on the suppord in the areas which are not to receive the film composite. Ordinary pressure-sensitive tape with a base of paper, cellulosic substance, resins, or the like may be employed because the heat which must be withstood is not significant during the formation of the initial films themselves. The masking tape or substance will, of course, be removed prior to the time of the final heat treatment, to obviate carbonization.

*Example 2*

A piece of glass on which a printed circuit had previously been formed was cleaned and placed in the vacuum evaporator. The materials to be evaporated were in this instance cadmium and selenium, which were placed in the respective boats. After the bell jar had been evacuated to a pressure of .1 micron, a thin layer of selenium was formed on the support which was masked as set forth above. Next, a relatively heavy layer of cadmium was produced superposed on the selenium layer. Finally, another layer of selenium was formed (enough to provide an excess of selenium), this time above the cadmium layer. The photocell was removed to the air. It was placed in a furnace wherein it was heated to 400° C. for a period of about one hour, the atmosphere during heating being an atmosphere of air.

It was found that the cadmium had reacted with the selenium to form cadmium selenide, and it was further found that the heat treatment involved resulted in substantially exact stoichiometric proportions in the cadmium selenide layer which is desirable in this type of photocell. The unreacted excess of selenium was found to have passed off by vaporization.

Photocells formed in this manner were uniform in characteristics and exhibited high sensitivity.

Cadmium telluride semi-conductors have also been made by this process; and the method is suitable for many other materials. A signal advantage of the formation of semi-conductive films by the method just outlined is that special atmospheres do not need to be used. The method is applicable to such metals as cadmium, indium, tellurium, antimony, and the like.

Considerable control of the semi-conductive characteristics of the article is possible through control of the heat treatment. For example, films of cadmium selenide made in accordance otherwise with Example 2 above but heat treated in the range of 300° to 350° C. are much less sensitive to high light levels than films reacted at 400° C., but they are more sensitive at very low light levels. Where stoichiometric proportions need not be attained through vaporization of any unreacted ingredient, the temperature of the heat treatment must at least be sufficient to produce the desired reaction; but the temperature may be carried beyond the reaction temperature as may be required to secure stoichiometry or sensitivity, up to the decomposition temperature of the film; and the temperature may vary with the materials and depending upon whether the heat treatment is carried on or not in a vacuum or in a special atmosphere.

It has been known that minute amounts of impurities affect the characteristics of semi-conductive materials, sometimes very greatly increasing their sensitivity. Among such impurities may be mentioned tellurium, arsenic, antimony, cerium, chromium, tin, manganese, silver and copper. The effect of these impurities differs with the material used. In a cadmium sulfide semi-conductor, manganese as an impurity gave very short time constants, while indium as in impurity gave high dark current characteristics. Light resistances as low as 10,000 ohms per square for a cadmium selenide semi-conductor were obtained using arsenic as an impurity.

*Example 3*

A cadmium selenide photocell was made as set forth in Example 2 above excepting that silver was added as an impurity to the cadmium before vaporization in an amount of about one part per thousand. Silver, therefore, appeared as an impurity in the final photocell film, and photocells made in this way exhibited reistance of 100,000 to 1 when exposed to light.

In the manufacture of other semi-conductive films, the same or other impurities may be added in a similar fashion.

In the manufacture of some semi-conductive films, their sensitivity is dependent upon the juncture of n and p areas. The present invention provides a convenient and simple way of producing films with alternating areas of the two types. The apparatus employed may be the same as that hereinabove described excepting that a mesh screen is placed near the surface of the substrate on which the films are to be formed, and the vapors of the metals or semi-metals are caused to reach the substrate surface through the meshes of the screen. The metals or semi-metals are sequentially vaporized in crucibles or boats at separated positions, so that a condition of parallax exists respecting the substrate surface and the sources of vaporized material. In other words, regarding any one mesh opening of the screen as an orifice through which vaporized material reaches the surface of the substrate, there will be adjacent relatively heavier deposits of the respective vaporized substances, producing regularly recurring deviations from stoichiometry.

Figure 3:
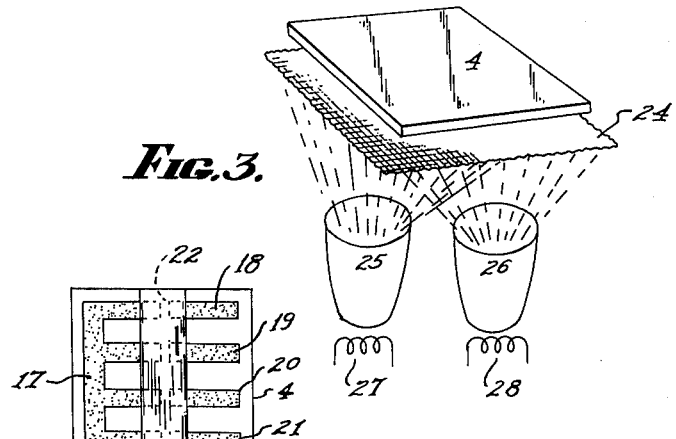
FIG. 3 is a diagrammatic view of an apparatus by which films may be formed differing in adjacent areas as to the relative quantities of two film-forming ingredients.

This is illustrated in FIG. 3 wherein the substrate is again indicated at 4. A wire mesh screen 24 is placed in front of the surface of the substrate but out of contact therewith. The anion and cation may be placed respectively in boats or crucibles 25 and 26, each provided with heating means diagrammatically represented at 27 and 28. The boats or crucibles are spaced laterally from each other to give the parallax effect illustrated by flow lines in the figure.

The nature and disposition of the alternating areas of opposite deviation from stoichiometry may be controlled by such factors as the spacing of the crucibles, the distance of the crucibles from the substrate surface, the mesh size of the screen, and the distance of the screen from the substrate surface.

In general, mesh sizes may be chosen in view of the desired geometry of the contrasting areas. For example, screen sizes of ¼ inch to 300 meshes to the inch may be employed in wire screens depending on various factors including the distance of the screen from the substrate, etc. Perforated plates of metal or other substances may be used. The screens are normally spaced from the substrate surface by convenient distances, say an inch, or fraction thereof. These matters may be the subject of calculation. Precautions well within the skill of the worker in the art can be taken if desired to insure that the vaporized substances reach the substrate surface only after passing through the screen. Crucible separation and distance can readily be chosen to insure that the film deposits are not made in precise superposition.

*Example 4*

A semi-conductive film was made using the apparatus diagrammatically illustrated in FIG. 3. The anion in crucible 25 was indium. The cation in crucible 26 was antimony. These materials were sequentially vaporized in the manner set forth above, and the resultant composite was found to consist in alternating regions of relatively high anion concentration and relatively high cation concentration.

The substrate bearing the composite film was removed and transferred to a furnace, and the film was heated therein to a temperature of about 400° C. for a time of about five minutes in a vacuum. It was found that the resultant semi-conductive film was characterized by alternating n and p type regions.

It was further found that the sharpness of the junctions between the n and p type regions was a function of the temperature and time of heat treatment.

Other cation-anion combinations to which the method of Example 4 is applicable are: indium-selenium, gallium-antimony, gallium-arsenic, aluminum-antimony, selenium-mercury, mercury-sulfur, lead-tellurium, cadmium-selenium, cadmium-tellurium, cadmium-sulfur, and the like.

In connection with films of certain metals or semi-metals the n and p characteristics are determined by the presence or absence of substances acting as donors or acceptors, as known in the art. Acceptors determine the p condition, and are substances of Group 3 of the Periodic Table (for Group 4 semi-conductors, such as silicon and germanium), e.g. aluminum, boron, gallium or indium. Donors determine the n condition and are materials of Group 5 of the Periodic Table (for Group 4), e.g. arsenic antimony or phosphorus. The donor and acceptor groups for other types of semi-conductors are well known in the art. Acceptors and donors are used in exceedingly small quantities such as one part per billion.

*Example 5*

Following the general procedure of Examples 3 and 4, a semi-conductive film was formed using n-germanium and p-germanium in the crucibles respectively. The resultant composite, characterized by alternating areas relatively rich in n-germanium or p-germanium was heat treated as hereinabove set forth.

It is also possible to lay down a film of germanium and then deposit thereon minute amounts of acceptors and donors by the parallax method described, but because of the very minute quantities of these additives, it will ordinarily be found more convenient to make up in advance quantities of the metal having n and p type characteristics.

By the treatment set forth above, films characterized by alternating n and p type characteristics may be made up using such metals as silicon or tellurium and suitable acceptors or donors.

Modifications may be made in the invention without departing from the spirit of it. The invention having been described in certain exemplary embodiments, what is new and desired to be secured by Letters Patent is:

1. A method of making a composite semi-conductive film on a substrate, which comprises sequentially exposing a surface of the substrate to vapors of n and p type material through the meshes of a screen from separate sources of the n and p type material spaced from each other in a plane, substantially parallel to the substrate surface, whereby the films so formed are characterized by alternating areas of different composition, and subjecting the composite so formed to a heat treatment.

2. The process claimed in claim 1 in which as initially formed the said films comprise alternating heavy and light deposit areas which areas are out of register with each other so that the heat treated composite is characterized by alternating areas having respectively n and p characteristics and meeting in a p–n junction.

3. The method of making a composite semi-conductive film on a substrate, the said film being characterized by repetitive n and p junctions, which comprises depositing on said substrate by vaporization from separated sources and through the meshes of a screen located in a plane substantially parallel to the substrate surface, two materials which, being deposited through the meshes of said screen by reason of parallax inherent in the separation of said sources, in repetitive areas characterized by varying quantities of the two materials will produce n and p junctions between said areas.

4. The process claimed in claim 3 wherein said materials are respectively anionic and cationic semi-conductive materials.

5. The process claimed in claim 3 including the step of initially forming a film of semi-conductor on said substrate and wherein the said two materials deposited through said screen are respectively acceptors and donors capable of forming with the predeposited film semi-conductors having n- and p-type characteristics.

6. The process claimed in claim 3 wherein the two materials constitute semi-conductors having respectively n- and p-type characteristics.

7. The method of making a semi-conductive device characterized by adjacent areas of n and p type materials, which comprises evaporating said n and p type materials from separated locations onto a base through a foraminous element characterized by a plurality of small spaced openings, whereby said n and p type materials are deposited in areas having a side by side relationship whereby to form n and p junctions between said areas.

References Cited by the Examiner

UNITED STATES PATENTS

| | | | |
|---|---|---|---|
| 2,759,861 | 8/1956 | Collins | 148—1.5 |
| 2,780,569 | 2/1957 | Hewlett | 148—1.5 |
| 2,817,311 | 12/1957 | Nack | 118—48 |
| 2,879,188 | 3/1959 | Strull | 148—1.5 |
| 2,929,753 | 3/1960 | Noyce | 148—33 |
| 2,964,435 | 12/1960 | Paskell | 148—33 |
| 2,989,941 | 6/1961 | Wolf | 118—48 |
| 2,994,621 | 8/1961 | Hugle et al. | 148—1.5 |

OTHER REFERENCES

Physical Review: vol. 92, No. 6, December 1953, pp. 1573–1576, Electronic Engineering, October 1946, pp. 316, 317 and 322.

BENJAMIN HENKIN, *Primary Examiner.*

RAY K. WINDHAM, DAVID L. RECK, *Examiners.*